United States Patent [19]
Krietzman

[11] Patent Number: 5,685,261
[45] Date of Patent: Nov. 11, 1997

[54] FLEA GATHERING AND DISPOSAL SYSTEM

[76] Inventor: Mark H. Krietzman, 25550 Hawthorne Blvd., Suite 101, Torrance, Calif. 90505

[21] Appl. No.: 555,939

[22] Filed: Nov. 13, 1995

Related U.S. Application Data

[63] Continuation-in-part of Ser. No. 132,394, Oct. 5, 1993, abandoned.

[51] Int. Cl.[6] ................................................. A01K 13/00
[52] U.S. Cl. .................................. 119/626; 15/104.5
[58] Field of Search ................................. 119/625, 626, 119/628, 650; 132/119; 15/104.5, 104.8

[56] References Cited

U.S. PATENT DOCUMENTS

| | | | |
|---|---|---|---|
| 2,885,704 | 5/1959 | Thompson | 15/104.5 X |
| 3,077,199 | 2/1963 | Evans | 15/104.5 X |
| 3,813,722 | 6/1974 | Sapochinik | 15/104.5 X |
| 5,205,011 | 4/1993 | Flener | 15/142 |
| 5,308,406 | 5/1994 | Wallock et al. | 15/104.5 X |

Primary Examiner—Robert P. Swiatek
Attorney, Agent, or Firm—John H. Vynalek; Frank B. Robb

[57] ABSTRACT

An arrangement for gathering fleas from fur with a comb (112) and wiping the fleas and loosened fur from the comb (112) so as to deposit them into a closeable container (101) for disposal. The container (101) has a rear end cap (102) in which moth balls may be mounted so that fumes fill the container. The front end cap (103) has a shaped opening (116) keyed to the shape of comb spline (113) to assist in guiding the comb (112) to wipers. The wipers are opposing blades (105) urged together but allow the comb (112) to be inserted between the blades (105), lifted through the blades (105) to remove the accumulated fleas and fur in a position to be deposited into the container (101). A cover (117) may be placed over the front end cap (103) to allow the vapors from the moth balls to act on the fleas. These active end caps may be removed for re-use on a new container (101). Disposable end caps are placed on each end of the container (101) and the used container (101) disposed.

13 Claims, 10 Drawing Sheets

FLEA GATHERING AND DISPOSAL SYSTEM

BACKGROUND OF THE INVENTION

1. Field of the Invention

This invention relates to the pest control art and, more particularly, to an improved device for the removal of fleas from fur, capture of the isolated fleas and disposal of the fleas without toxic material. This is a Continuation in Part of Ser. No. 08/132,394 filed Oct. 5, 1993 which is abandoned upon the filing of this application.

2. Description of the Prior Art

The history of flea control has generally involved solutions which involve toxic substances being dispensed where fur bearing animals and humans may also come into contact with the toxic substance. With the concern about exposure to carcinogenic substances, these solutions have become unacceptable.

One solution which does not involve toxic substances is the use of a brush or comb to dislodge the fleas from the animal. The teeth of the comb are generally stiff and closely spaces so that the comb can pass through the fur but the fleas cannot pass between adjacent teeth of the comb. This device is effective at removing fleas from fur. However, unless the fleas are captured from the comb after they are gleaned from the fur, they quickly jump off the comb and find their way back to the animal.

Attempts to combine a comb with a capture system such as a vacuum cleaner have not been successful as the noise of the vacuum cleaner tends to scare the animal. Further, the vacuum cleaner is not sealed. If the filter bag in which the fleas are gathered is not immediately changed, the fleas will exit the vacuum cleaner within a short time. Further, even if the bag is changed, the fleas within the bag survive to escape while awaiting waste disposal of the bag.

A hair-comb cleaning device such as that taught by U.S. Pat. No. 3,813,722 ('722) teaches the construction of a box with opposing spongy strips with centrally located bristle tufts. A contaminated comb may be inserted below the strips, pulled through between the strips and emerge after being wiped clean. '722 teaches the use of a resevor of antiseptic liquid in contact with the spongy strips. However, after the comb is cleaned '722 teaches removal of the spongy strip for cleaning. No provision is made nor is any suggested for the collection of debris within the box. The teaching of this patent and experience shows that the hair is retained by the brush. Thus, this technology fails to release the hair so that it may be disposed.

Another comb cleaning devices such as that taught by German Patent 26 48 314 (DT197804) issued 27/04/78 teaches almost the identical solution of insertion of a comb below a set of opposing, foam wipers, moving the comb through the wipers but it includes the teaching of collecting the hairs, etc. inside a box. Neither patent teaches or even suggests the providing of means to seal and cleaning strips or the box contain the hair, etc. within the devices.

These and prior solutions for cleaning a comb teach the removal of hair from a comb while applying antiseptic and even teach collecting the hair while cleaning the comb. If any one of these solutions or combinations thereof were to be attempted to deal with fur contaminated with fleas they would fail.

Further, the insertion of a fur and flea bearing comb into some of the suggested devices would result in the loss of fur from the comb or escape of the fleas before the comb is fully inserted.

None of the solutions provides for a closeable system to contain the fleas once the fur and fleas are collected by the device. Even the device which teaches the immediate application of antiseptic liquid would not control the fleas. The sponge and bristle wipers would simply become contaminated with live fleas posing the continued issue of collection, containment and elimination. An antiseptic liquid on the comb would cause the comb to become tangled in the fur and may be detrimental to the skin of the fur bearing animal.

Thus there has long been a need for an arrangement which may be used to contain and dispose of fleas without utilizing toxic substances. However, once the fleas are captured and contained within the device, it is desired that some non-toxic method be used to kill the fleas so that the contents of the device may be disposed without the chance of the fleas returning.

Further, it is desired that, the device allow convenient insertion of the fur and flea bearing comb into the cleaner without dislodging the fur or fleas until the comb is within the containment system.

Further, it is also desired that the dislodging means be able to remove fleas from the junction of the comb spline and the comb teeth where the fleas tend to find a niche in which to hide and avoid displacement from the comb.

SUMMARY OF THE INVENTION

Accordingly, it is an object of the present invention to provide an improved device for the cleaning of a fur and flea bearing comb.

It is another object of the present invention to provide a opening in the device into which the fur and flea bearing comb may be fully positioned before cleaning.

It is yet another object of the present invention to provide an improved cleaning of the comb to dislodge the fur and fleas even from that small crevice formed between the comb spline and teeth.

It is yet another object of the present invention to provide for the total containment of the fur and fleas within the device once removed from the comb.

It is yet another object of the present invention to provide a non-toxic method of killing of the fleas within the device so that they may be safely disposed without the ability of the once captured fleas to reinfect the user's premises.

The above and other objects of the present invention are achieved, according to a preferred embodiment thereof, by providing an improved set of opposing blades to wipe the fur and fleas from the teeth of the comb. The keying of the spline of the comb with the opening of the container greatly assists the alignment of the comb with the blades and the capture of the fleas from the nitch formed at the junction of the teeth and the spline of the comb.

In the preferred embodiment, the application of vapors from moth balls in the container kills the fleas within a short time so that the contents of the container may be disposed. After the fur and fleas are deposited into the container from the comb, the active end caps of the container may be removed, throw away end caps applied and the entire container may be thrown away. The active end caps may be inserted into a clean container and reused.

BRIEF DESCRIPTION OF THE DRAWINGS

The above and other embodiments of the present invention may be more fully understood from the following detailed description, taken together with the accompanying drawing, wherein similar reference characters refer to similar elements throughout, and in which.

DESCRIPTION OF A PREFERRED EMBODIMENT

Figure 1:
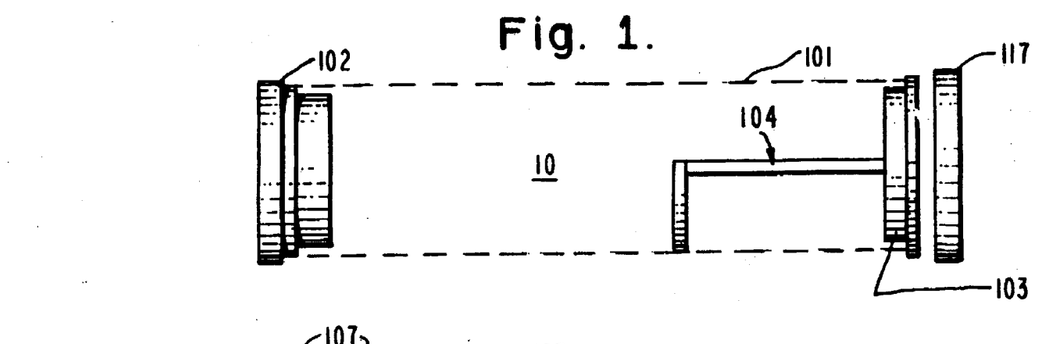
FIG. 1 represents a side view of the present invention.

Referring now to the drawing, there is illustrated in FIG. 1 a horizontal side view of the preferred embodiment of the device constructed according to the invention generally designated 10. The device 10 has a hollow container 101 with a rear end cap 102, a front end cap 103 and a cover 117 for the front end cap 103.

Figure 2:
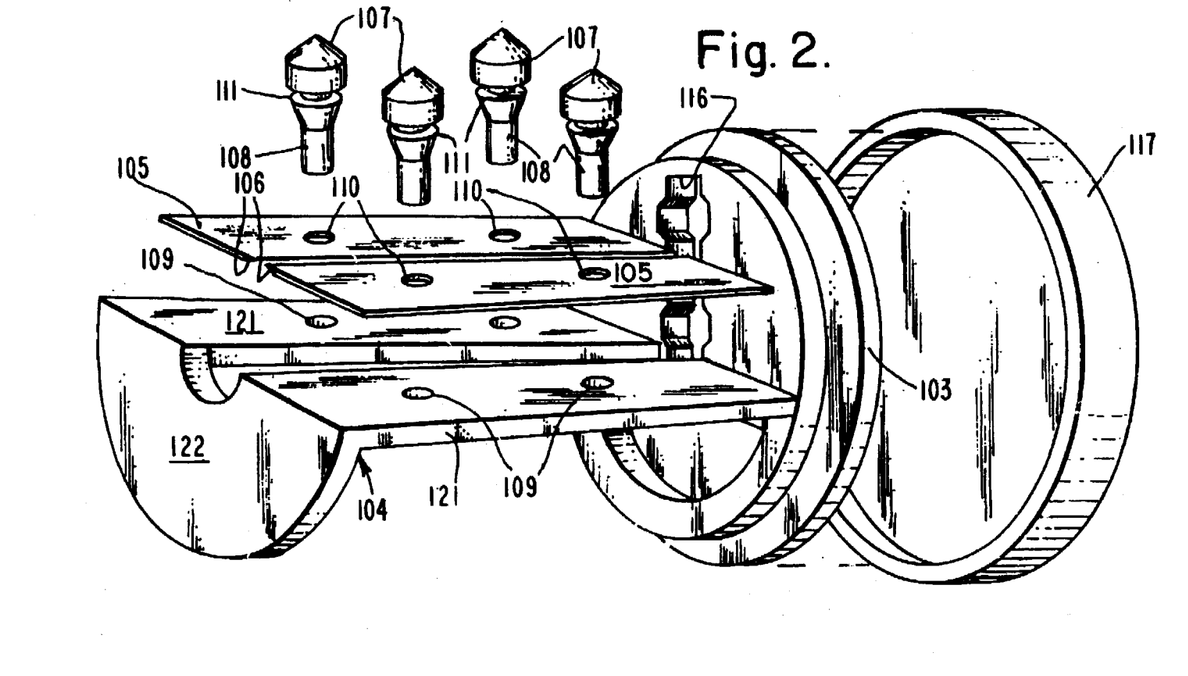
FIG. 2 illustrates a perspective view of the assembly of the wiper of the present invention.

FIG. 2 illustrates a perspective view of a mount 104 attached to the front end cap 103 and extending into the container 101. The mount 104 consists of two parallel panels 121 mounted perpendicular to the inside surface of the front end cap 103. A support 122 shaped to conform to the inside surface of the container 101 and mounted to the ends of the panels 121 remote from the front end cap 103 supplies stability.

A plurality of first walls 109 are fabricated in the mount 104 forming blade mounting holes. A pair of blades 105 is provided and fabricated of ridged material with openings 110 formed to align with first walls 109 upon the juxtaposed positioning of a selected edge of the blades 105 on the mount 104. The blades 105 are held in place with a plurality of bushings 107.

Each bushing 107 is fabricated of rubber and shaped with a retaining pin 108 of a preselected diameter smaller than the diameter of the top of the bushing 107.

The retaining pin 108 is insertable through the openings 110 and into the holes formed by first walls 109.

The retaining pin 108 is formed with a stop 111 which, upon insertion of pin 108 through opening 110, holds the blade 105 adjacent to the thicker top of bushing 107.

Second wall 116 forms an opening in the front end cap 103 adjacent the blades 105 and perpendicular to the juxtaposed edges of blades 105.

The blade 105 may be fabricated with a shaped edge 106 to reduce the friction between the edge of the blade 105 and the teeth 114 of the comb 112. In the preferred embodiment, the edge 106 is shaped from the lower surface of the blade 105 so that a smooth, flat upper surface is presented.

Figure 3:
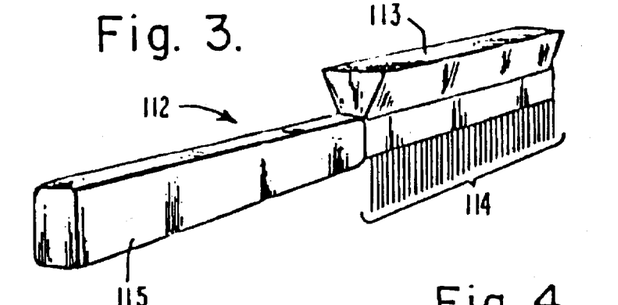
FIG. 3 illustrates a perspective view of a comb of the present invention.

FIG. 3 illustrates a comb generally designated 112 which may be used in the flea removal device 10. The comb 112 is fabricated with a spline 113 of a preselected cross-sectional shape. A handle 115 is mounted to one end of the spline 113. A plurality of teeth 114 are mounted perpendicular to one edge of the spline 113 forming a junction. The teeth 114 are fabricated in a preselected cross-sectional shape and mounted essentially parallel to each other a preselected distance apart. When the user passes the comb 112 through flea infested fur, the spacing of the teeth 114 allows the fur to pass between the teeth 114 but forces the fleas to be pushed ahead of the teeth 114 to be lifted away from the fur.

Figure 4:
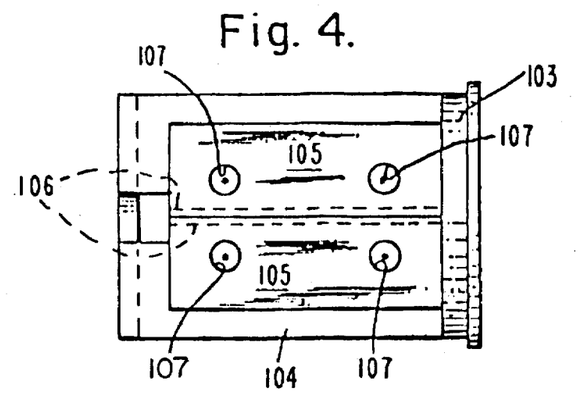
FIG. 4 illustrates a top view of the assembled wiper of the present invention.
Figures 5, 6:
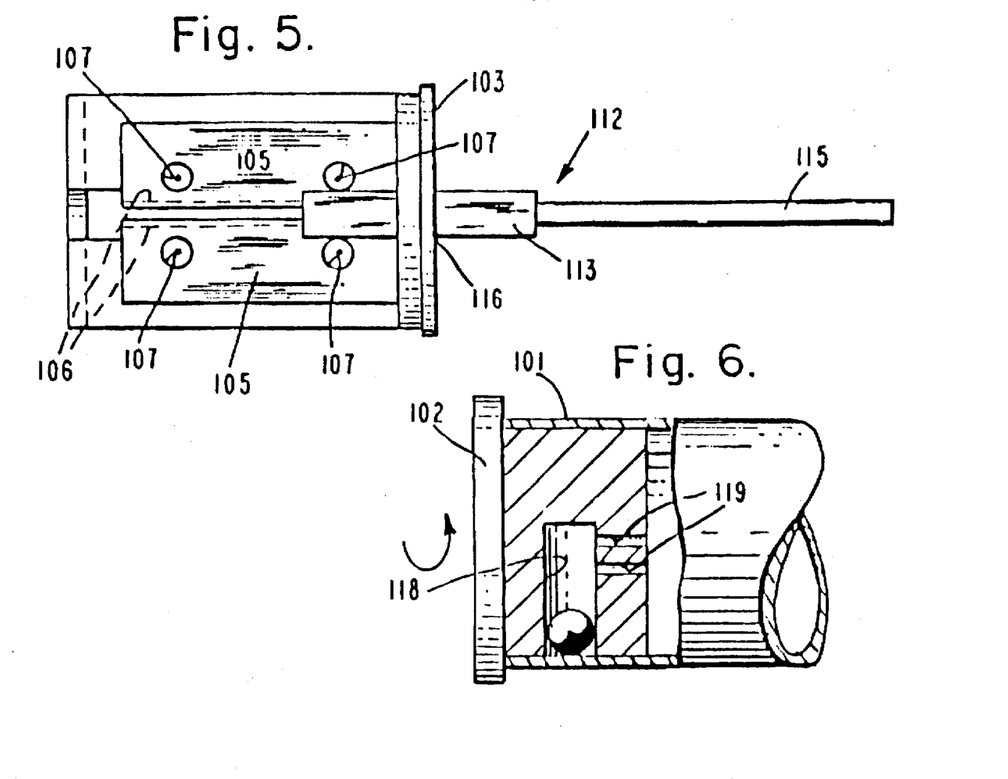
FIG. 5 illustrates a top view of a comb partially inserted into the wiper of the present invention.
FIG. 6 illustrates the rear end cap of the present invention.

FIGS. 4 and 5 illustrate the removal of the fleas from the comb 112 by the device 10 according to the principles of the present invention.

As shown in FIG. 4, the shaped edges 106 of the blades 105 are held together on the mount 104.

FIG. 5 illustrates how the comb 112 may be inserted through a opening in the front end cap 103 formed by second wall 116. The cross-sectional shape of the spline 113 may be selected to be slightly smaller but match the shape of second wall 116 thus being keyed to assist the user in positioning the junction of the spline 113 and teeth 114 along the smooth flat surface of the top of blades 105. The elasticity of the rubber bushings 107 allows the shaped edges 106 of the blades 105 to be separated upon the insertion of the teeth 114. Second wall 116 is shaped to allow the teeth 114 and accumulated fur and fleas to be inserted below the blades 105 without dislodging the fur. After fully inserting the comb 112, the user may lift the comb 112 above the blades 105 thereby wiping the fur and fleas off the teeth 114 and depositing the fur and fleas within the container 101.

The shape of second wall 116 illustrated in FIG. 2 may include a second key shaped opening above the first key shaped opening both being slightly larger than the cross-section of spline 113 so that after raising the comb 112, the cleaned comb may be removed from the container 101 at a position above the blades 105.

As illustrated in FIG. 2, a cover 117 is provided to be placed over the outside surface of the front end cap 103 thereby sealing the opening formed by second wall 116.

FIG. 6 illustrates the configuration of the rear end cap 102 fabricated with a plurality of first channels 118 to allow the user to mount moth balls therein. First channels 118 are positioned within the rear end cap 102 so that the moth balls are retained therein upon insertion of the rear end cap 102 into the container 101. Second channels 119 communicate between first channel 118 and the interior of the container 101 so that fumes from the moth balls will enter the container 101 and asphyxiate any fleas therein.

Figure 7:
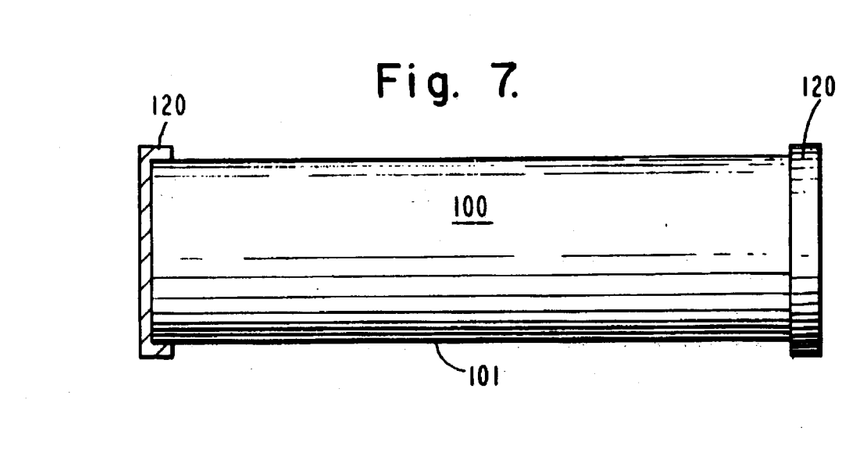
FIG. 7 illustrates a side view of the assembly ready for disposal.

After the user has gathered fur and fleas and deposited them into the device 10, placed the cover 117 over the opening in the front end cap 102, and set the device aside for a few hours to let the vapors from the moth balls kill the fleas, the user may remove the rear end cap 102 and the front end cap 103. Each end of the container 101 may then be fitted with a disposable end cap 120 shown in FIG. 7. The entire disposable device, generally designated 100, may be thrown away. The end caps 102 and 103 may be fitted onto a clean container 101.

Figure 8:
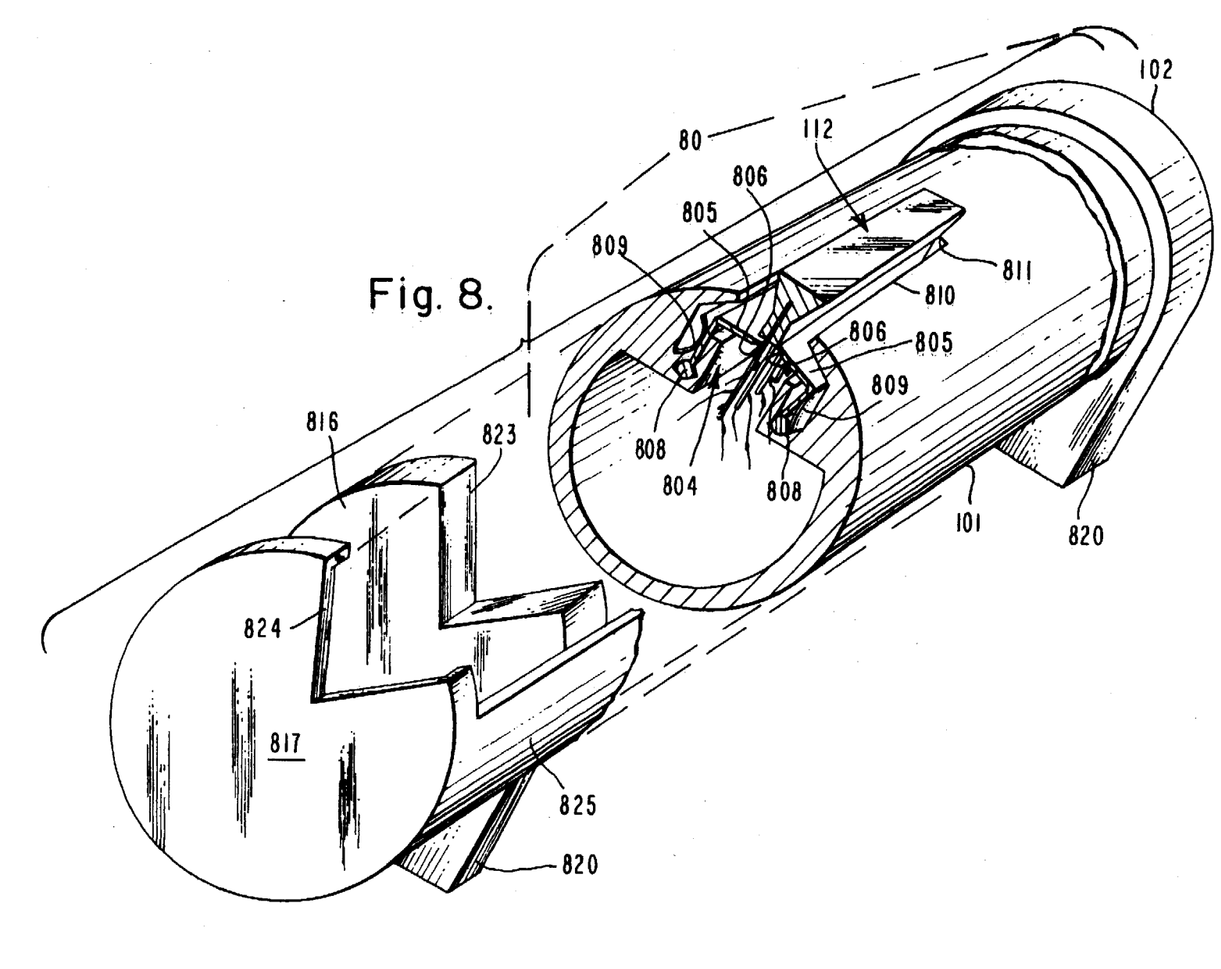
FIG. 8 illustrates a perspective view of another embodiment of the present invention.

FIG. 8 illustrates another embodiment of the means to wipe fur and flea from the comb generally designated 80. Juxtaposed "L" shaped blades 805 are attached at the end of one leg by a hinge 808 to a mount 804. Each blade 805 is urged into position by a spring 809 so that the edges 806 of the blades 805 abut. One end of container 101 is fitted with a rear end cap 102. The wiping means 80 is installed on the other end of a container 101 so that it extends into the container. The wiping means 80 may abut against the rear end cap 102 or a back panel 811 may be mounted at the rear edge of the wiping means 80. A front end cap 816 is installed on the outside end of the wiping means 80. An end cap opening 823 is formed in the end cap 816 to allow insertion of the comb 112 into the blades 805. A longitudinal slot 810 is formed in the edge of the container 101 to allow the comb 112 to be inserted into the wiping means 80. A back panel 811 limits the inward travel of the comb 112, abuts the remote edges of the blades 805 to keep the fur and fleas within the container 101 during the wiping operation. A rotatable end cap 817 with a cover opening 824 and a tab 825 is fitted over the outside of the second end cap 816. The cover opening 824 may be rotated to match the opening so that tab 825 covers longitudinal slot 810 in the end cap 816 to allow access to the blades 805 for insertion of the comb 112 or rotated to not match the opening to complete the seal of the container 101 in a manner shown in FIGS. 10 and 11. Both the rear end cap 102 and the front end cap 816 may be formed with an extension 820 having a flat edge to form a stand. As described above, the teeth 114 of the comb 112 are placed between the blades 805 at the junction between the teeth 114 and the spline 113. After insertion, the comb 112 is raised to draw the teeth 114 through the blades 805 to wipe fur and fleas from the comb 112 and deposit the fur and fleas into a container 101.

Figure 9:
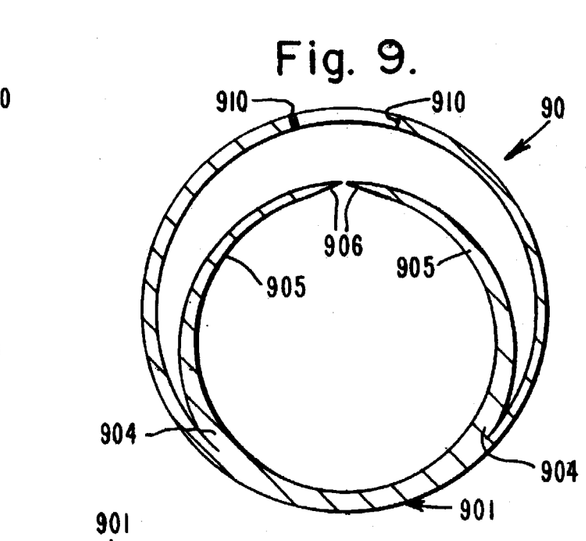
FIG. 9 is a cross section of another embodiment of the present invention.

FIG. 9 illustrates yet another embodiment of the device generally designated 90. The juxtaposed blades 905 are fabricated of resilient plastic. The blades extend to a mounting base 904 which is mounted inside a container 901 so that the edges 906 abut.

Figure 10:
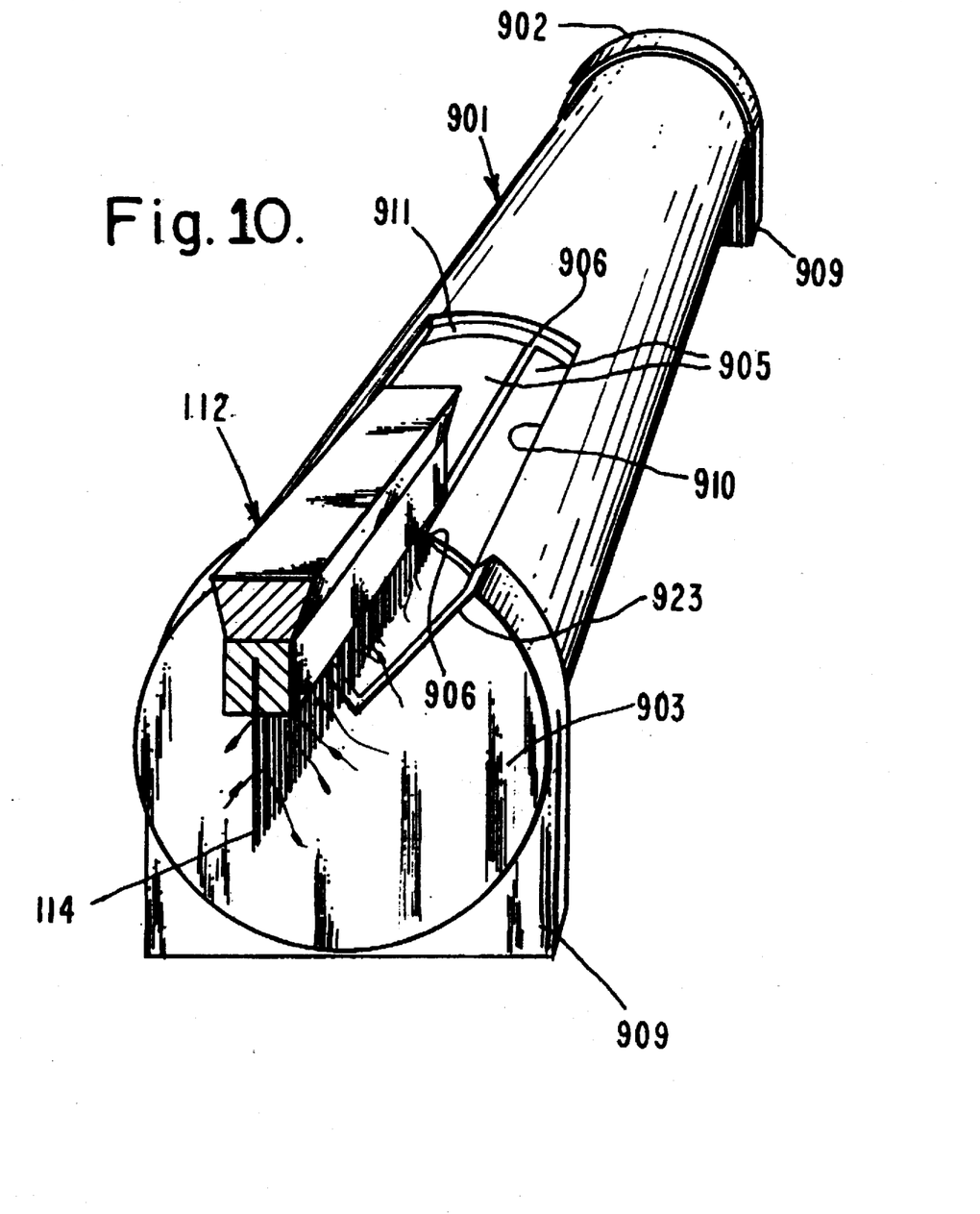
FIG. 10 illustrates another embodiment of the present invention.

FIG. 10 illustrates the assembled device 90 into which the blades 905 are incorporated. The device 90 may be fitted with a front end cap 903 and a rear end cap 902. A portion of the outside edges of the end caps 903 and 902 is extended and formed flat to provide a stand 909 for the device 90. A longitudinal slot 910 is formed in the outside surface of the container 901 to allow the comb 112 to be inserted between the blades 905. If the remote edges of the blades 905 do not touch the rear end cap 902, a back panel 911 limits the inward travel of the comb 112, abuts the remote edges of the blades 905 to keep the fur and fleas within the container 901 during the wiping operation. A slotted end cap 903 is fitted over the front end of the blades 905 to complete the seal of the container while allowing access to the blades 905 for insertion of the comb 112.

The comb 112 may be inserted between the blades 905 and raised up to wipe the fur and fleas into the container 901.

Figure 11:
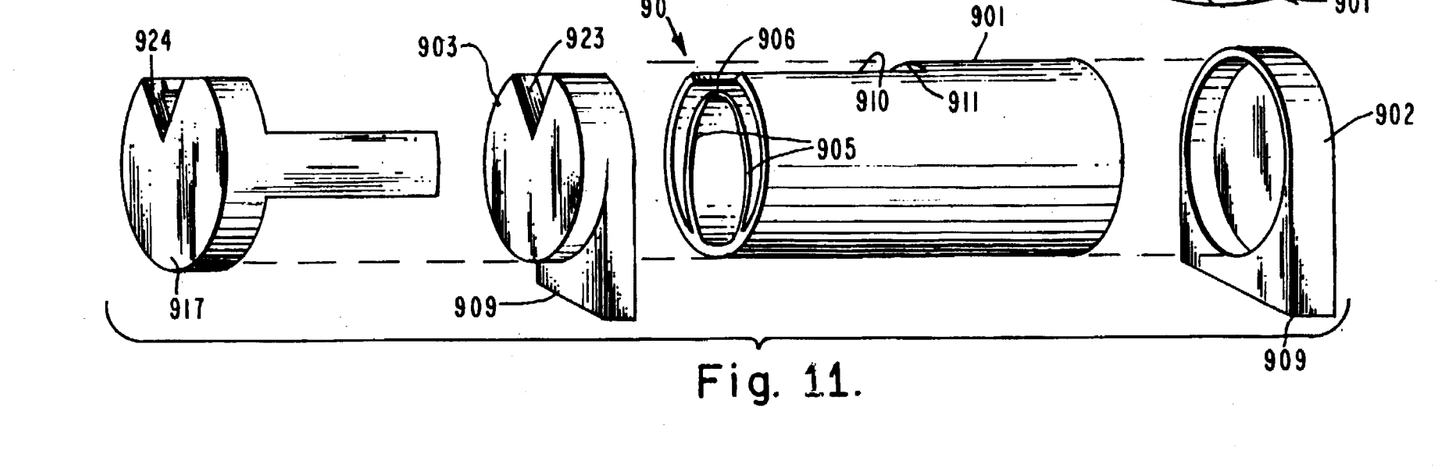
FIG. 11 is a perspective view of an embodiment of the cover.

FIG. 11 illustrates an cover 917 shaped to snap over the outside surface of the front end cap 903 and rotate. The cover 914 has a large notch matching the shape of the opening in the front end cap 903. When the notch is aligned with the opening, the user has access to the blades 905. After depositing the fur and fleas, the user may rotate the cover 914 to close the container 901.

The wipers illustrated in wiping means 80 and in device 90 may be used with a simple rectangular shaped spline 113. The opening may be located so that the spline 113 of comb 112 is fully inserted below the wiper (805/905) and lifted through the wiper 805/905 and out of the container through the longitudinal slot 810/910. The force urging the wipers together will cause the edges 906 of the wipers to follow the contour of the comb 112 particularly the junction formed by the spline 113 and the teeth 114 thereby wiping fur and fleas from the comb 112. The fleas tend to accumulate at the junction.

Figures 12A, 12B:
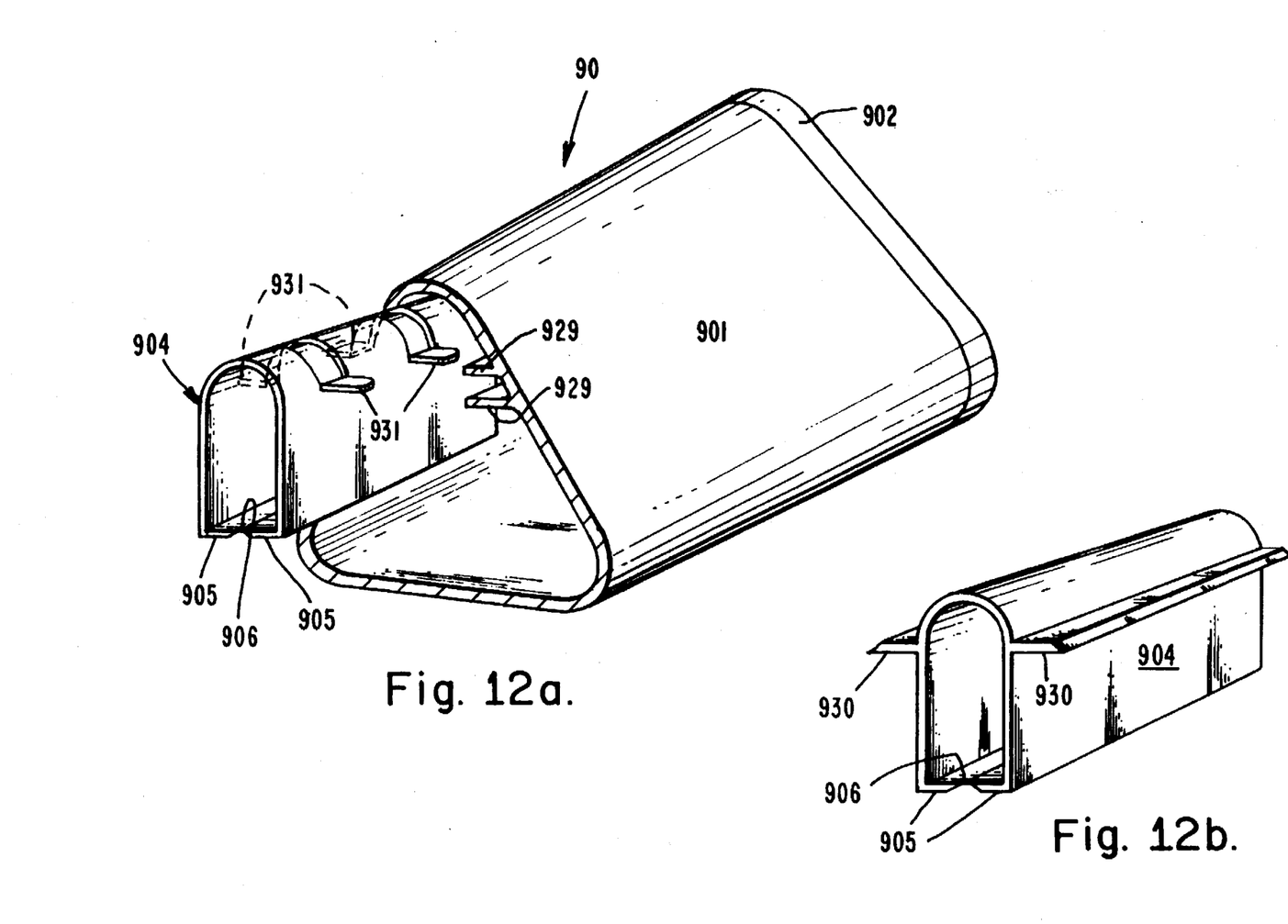
FIG. 12A is a perspective view of another embodiment of the present invention.
FIG. 12B is a perspective view of an insertable blade embodiment of the present invention.

FIG. 12A illustrates yet another embodiment of the device generally designated 90. The juxtaposed blades 905 are fabricated of resilient plastic. The blades extend from a mounting base 904 which is removably mountable inside a container 901 so that the edges 906 abut. A plurality of mounting tabs 931 are formed in the mounting base 904. An upper support guide 929 and a lower support guide 928 are mounted inside container 901. When the mounting base 904 is inserted into the container 901, the mounting tabs 931 engage the upper support guide 929.

FIG. 12B illustrates yet another embodiment of the arrangement of the mounting base 904 and blades. Extensions 930 extend perpendicular to the mounting base 904 and upon being inserted into the container 901, the extensions 930 are shaped to be removably/engagable between the upper support guide 929 and the lower support guide 928.

Figure 13:
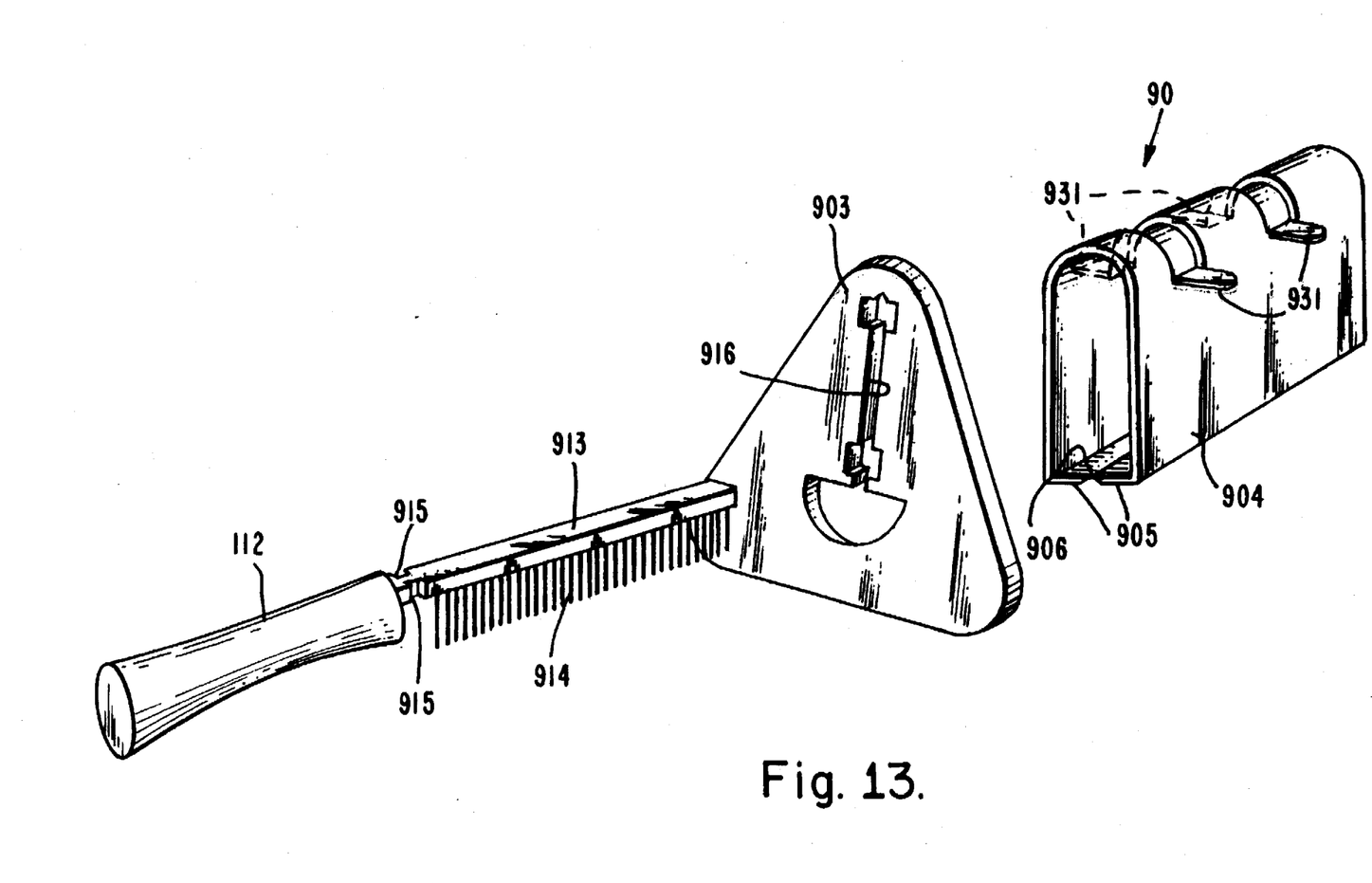
FIG. 13 is a perspective view of a key hole front cover and blade embodiment of the present invention.

FIG. 13 illustrates a partial embodiment of the arrangement using mounting tabs 931 and showing and end cap 903 with an opening formed by key hole walls 916 shaped to allow the spline 113 to be inserted through the opening lower portion of 916 thereby directing the teeth 114 to the abutting blade edges 906. The user must insert the spline 113 into the opening until the key hole guides 915 are aligned with the key hole walls 916. Upon alignment, the user may raise the comb, drawing the teeth 114 through the opposing blade edges 906 and thereby depositing the fur and fleas inside the container for the device 90. After the user has raised the comb to the upper portion of the opening, the keyhole guides 915 are disengaged from the opening and the user may pull the comb out of the device 90.

Figure 14:
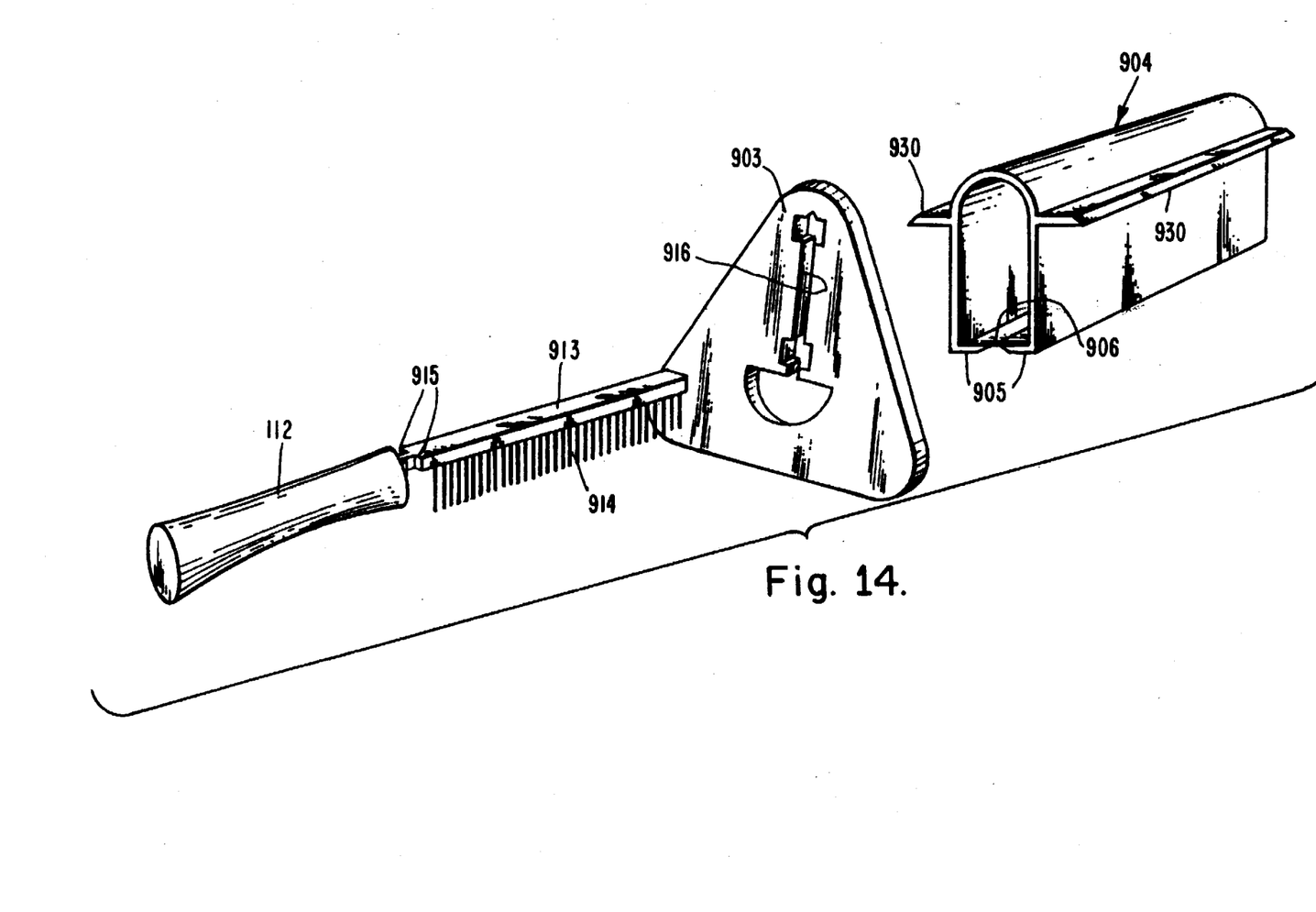
FIG. 14 is a perspective view of another key hole front cover and blade embodiment of the present invention.

FIG. 14 illustrates a partial embodiment of the arrangement using extensions 930 and showing an end cap 903 with an opening formed by key hole walls 916 shaped to allow the spline 113 to be inserted through the opening 916 thereby directing the teeth 114 to the abutting blade edges 906.

Figure 15:
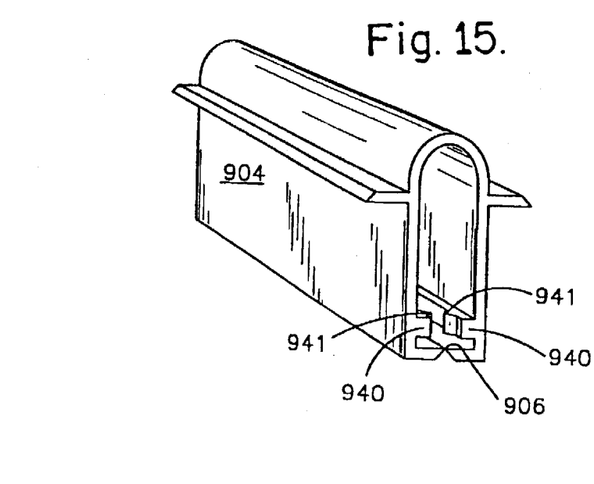
FIG. 15 illustrates another embodiment of the insertable blade embodiment of the present invention.

FIG. 15 illustrates a mounting base 904 which incorporates opposing spreader bars 940 mounted above the abutting blade edges 906. A plurality of rear catches 941 are mounted on the inside surface of the opposing bars 940 near the handle 112.

Figure 16A:
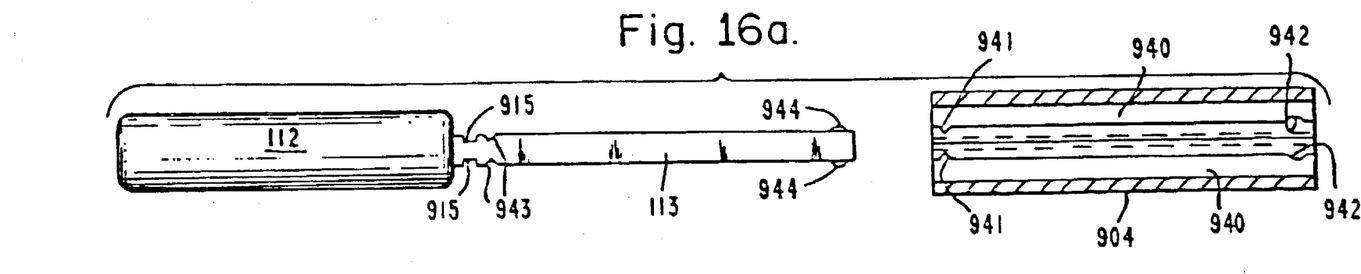
FIG. 16A illustrates the comb and the insertable blade embodiment of the present invention.
Figure 16B:
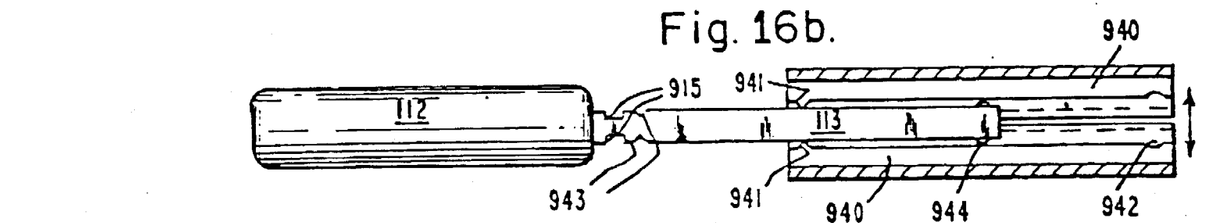
FIG. 16B illustrates partial insertion of the comb into the blade embodiment of the present invention.
Figure 16C:
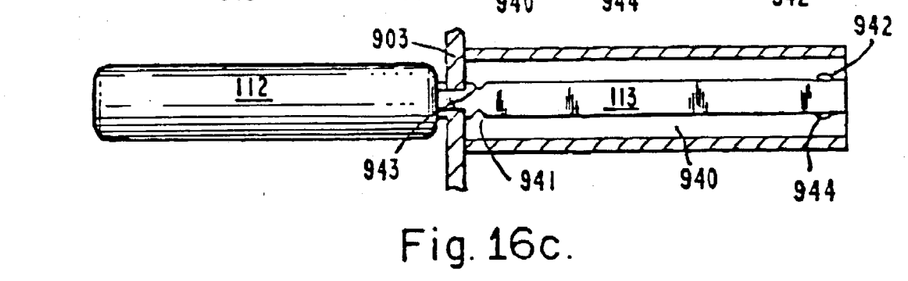
FIG. 16C illustrates the comb fully inserted into the blade embodiment of the present invention; and, FIG. 17 is a perspective view of an embodiment of the present invention with a key hole cover.

The function of the spreader bars 940 is illustrated in FIGS. 16A, 16B and 16C.

If the teeth 114 are repeatedly pushed between opposing blade edges 906, the edges of the opposing blade edges 906 become dull, especially if the blade edges are fabricated of plastic. The opposing spreader bars 940 solve the problem of dulling blade edges 906 upon repeated use of the device 90. The opening formed by key hole walls 916 aids in alignment of the spline 113 with the spreader bars 940. Upon insertion of the comb 112 illustrated in FIG. 16A into the device 90, the spline latch/catch arrangement 943/944 on the spline 113 presses against the catch/latch arrangement 941/942 on the spreader bars 940 and along the opposing edges of the spreader bars 940 thereby holding the edges 906 a preselected distance apart to allow the blade edges 906 to wipe fleas from the junction of the teeth 114 and the spline 113. As shown by FIG. 16B the teeth 114 may pass along and between the edges 906 without wearing the edges 906. Upon full insertion of the spline 113 as shown by FIG. 16C, the spline latch/catch arrangement 943/944 engages the corresponding catch/latch arrangement 941/942 of the spreader bars 940. After engagement, the edges 906 are no longer held apart. The user may feel a snapping of the engagement of the latch/catch arrangement as edges 906 now apply pressure to the teeth 114 so that upon the condition of the teeth 114 being drawn vertically through the edges 906, the teeth 114 are wiped of any fur and fleas.

Figure 17:
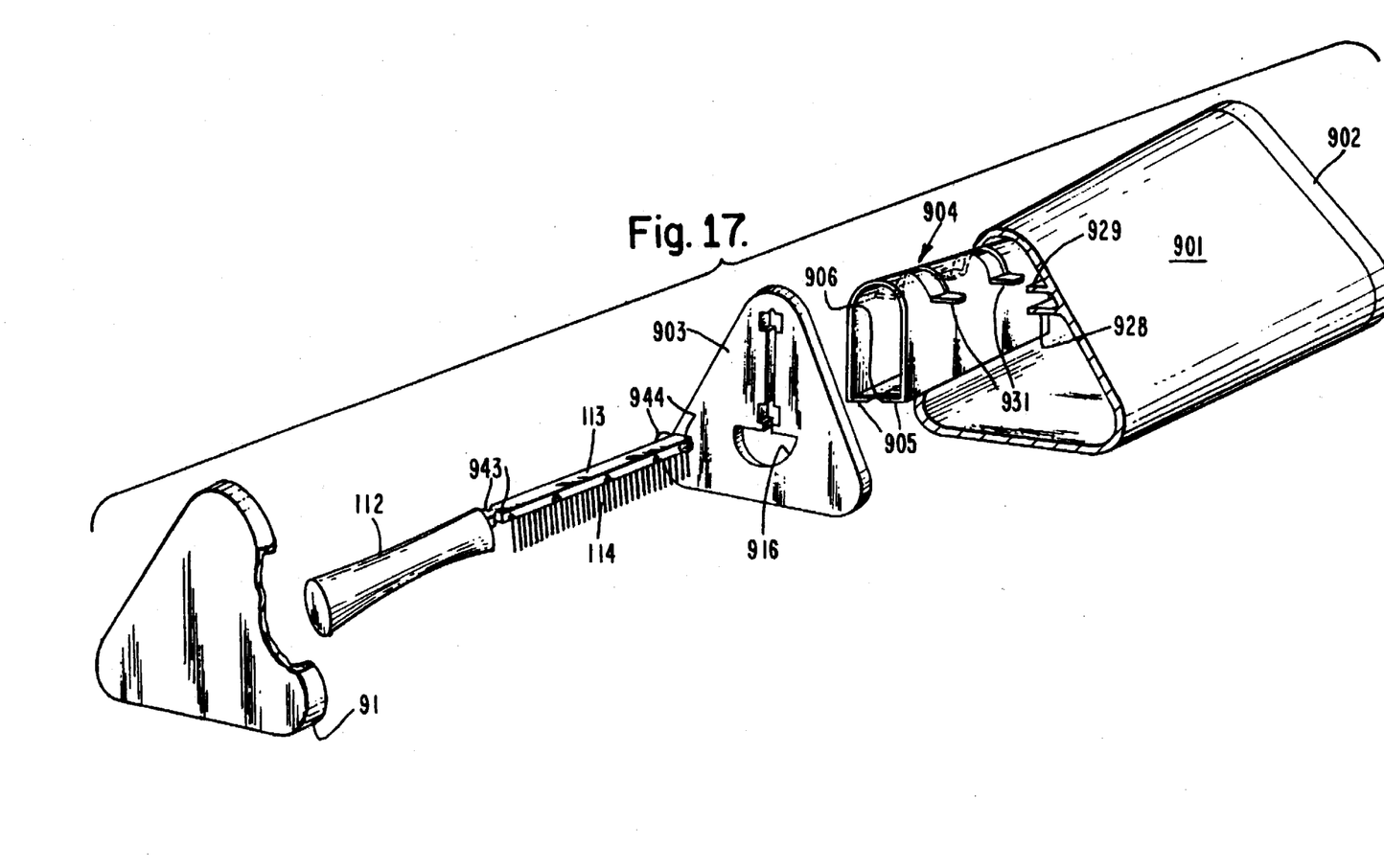

FIG. 17 illustrates a perspective view of an exploded, disassembled device generally designated 11. The container 901 with rear end cap is fabricated with internal lower support guides 928 and upper support guides 929. The mounting base 904 is fabricated with mounting tabs 931 which engage the upper support guides 929 upon insertion of the base 904 into the container 901. The front end cap 903 is snapped onto the container 901. The user may now use the comb to collect fur and fleas, periodically cleaning the teeth 114 of the comb 112 by first inserting the comb through the lower portion of the key hole opening 916, lifting the comb 112 vertically to clean the teeth 114 and removing the comb 112 from the device at the top portion of the key hole opening 916. After the user has completed gathering fur and fleas, the user may place the cover 914 over the front end cap 903 to form an air tight containment of the fur and fleas. Moth balls as described above may be inserted or mounted within the device 11 to kill the collected fleas.

Since certain changes may be made in the above apparatus without departing from the scope of the invention herein involved, it is intended that all matter contained in the above description, as shown in the accompanying drawing, shall be interpreted in an illustrative, and not a limiting sense.

What is claimed is:

1. A non-toxic arrangement for the removal of fleas from fur and the disposal of the removed fleas and dislodged fur, comprising in combination:
   a comb having:
      a handle;
      a spline having one end attached to said handle;
      a plurality of teeth of a preselected cross section mounted perpendicular to one edge of said spline forming a junction, said teeth being essentially parallel and spaced a preselected distance apart;
   means for flea and fur disposal having:
      a container;
      a front end cap removably attachable to one end of said container;
      a mount extending from said front end cap into said container;
      walls forming an opening in said front end cap whereby the user may partially insert said comb through said opening;
      wiping means attached to said mount whereby under the condition of said comb being inserted through said opening and into said wiping means, the user may draw said teeth through said wiping means thereby depositing any fur and fleas thereon into said container;
      a rear end cap removably attachable to the other end of said container; and,
      a cover removably attachable over the outside surface of said front end cap thereby creating an enclosed space.

2. The arrangement defined in claim 1 wherein said wiping means comprises:
   a plurality of blades; and,
   a plurality of flexible bushings attaching said blades to said mount so that a pair of blades have juxtaposed edges urged into abutting alignment and may be spread apart by the insertion of said teeth between said abutting edges.

3. The arrangement defined in claim 2 wherein said bushings are fabricated of rubber.

4. The arrangement defined in claim 2 wherein the sides of said juxtaposed edges of said blades which wipe fur and fleas from said teeth are shaped to reduce friction against said teeth.

5. The arrangement defined in claim 1 where said rear end cap further comprises:
   first channels formed to hold moth balls within said end cap under the condition of said end cap being inserted into said container; and,
   second channels communicating between said first channels and the interior of said container.

6. The arrangement defined in claim 1 further comprising:
   disposable end caps attachable to the ends of said container thereby containing fur and fleas within said container under the condition of said front end cap and said rear end cap being removed from said container.

7. The arrangement defined in claim 1 wherein:
   said spline is formed in a preselected cross-sectional shape; and,
   a selected portion of said walls are formed to allow insertion of said spline thereby guiding said teeth to said wiping means.

8. A non-toxic system for the removal and disposal of fleas from fur, comprising in combination:
   a comb having:
      a handle;
      a spline having one end attached to said handle;
      a plurality of teeth mounted perpendicular to one edge of said spline forming a junction, said teeth being essentially parallel and spaced a preselected distance apart;
   means for flea and fur disposal having:
      a container;
      a base mounted to the inside surface of said container;
      a plurality of wipers, each having two spaced apart edges, one edge being hingedly mounted to said base under the condition of the free edge opposing at least the free edge of another wiper;
      biasing means mounted between said base and said wipers whereby said free ends are urged together with a preselected force;
      a rear end cap removably attachable over one open end of said container;
      a back panel mounted on said base to abut the rear most edge of said wipers whereby all fur and fleas are retained within said container;
      a front end cap removably attachable over the second open end of said container and having an opening of a preselected shape aligned perpendicular with said opposing edges of said wipers;
      a cover rotatably mountable over the outside surface of said front end cap and having an opening of a preselected shape whereby under the condition of the user rotating said cover to align said opening with said opening of said front end cap, the user may first, pass said comb through flea containing fur and second, insert said comb through said opening and under the free edges of said plurality of wipers, pass said spline and teeth of said comb between said free ends of said wipers which follow the contours of said spline and said junction thereby displacing all fleas and fur on said comb into said waste disposal, and upon removal of said comb, the user may rotate said cover to close said container.

9. The arrangement defined in claim 8 where said spline is a preselected shape and said door is formed in the cross section of said preselected shape to admit said shaped spline in only one orientation.

10. The arrangement defined in claim 8 where said front and back end caps further comprise an extended flat edge forming a stand.

11. The arrangement defined in claim 8 where said opposing free edges of said wiper are shaped to reduce friction against said comb.

12. A non-toxic arrangement for the removal of fleas from fur and the disposal of the removed fleas and dislodged fur, comprising in combination:

a comb having:
 a handle;
 a spline of a preselected cross-sectional shape having one end attached to said handle;
 a plurality of catches mounted at the end of said spline remote from said handle;
 a plurality of latches mounted on said spline near said handle;
 a plurality of teeth of a preselected cross section mounted perpendicular to one edge of said spline forming a junction, said teeth being essentially parallel and spaced a preselected distance apart;

means for flea and fur disposal having:
 a container;
 a plurality of support guides mounted inside said container;
 a front end cap removably attachable to one end of said container;
 walls forming an opening in said front end cap whereby the user may partially insert said comb through said opening;
 a mount insertably removable from engagement with said support guides;
 wiping means attached to said mount whereby under the condition of said comb being inserted through said opening and into said wiping means, the user may draw said teeth through said wiping means thereby depositing any fur and fleas thereon into said container;
 spreader bars attached to said mount above said wiping means;
 a plurality of catches and latches mounted on said spreader bars at a point engagable with said catches and latches mounted on said spline to be engaged upon the condition of said spline fully inserted between said spreader bars;
 a rear end cap removably attachable to the other end of said container; and,
 a cover removably attachable over the outside surface of said front end cap thereby creating an enclosed space.

13. The arrangement defined in claim 12 wherein:

said spline further comprise keyhole guides mounted near said handle; and, a selected portion of said walls are formed to allow insertion of said spline thereby guiding said teeth to said wiping means until said latches and catches engage thereby positioning said keyhole guides to allow vertical movement of said spline from the arrangement.

* * * * *